United States Patent Office 3,534,934
Patented Oct. 20, 1970

1

3,534,934
CONSTANT SUPPORT DEVICES
Peter McCabe, Godalming, Surrey, England, assignor to Vokes Limited, Guilford, Surrey, England
Filed May 16, 1968, Ser. No. 729,582
Claims priority, application Great Britain, May 17, 1967, 22,889/67
Int. Cl. F16l 3/20
U.S. Cl. 248—54                 5 Claims

ABSTRACT OF THE DISCLOSURE

A constant support device comprises a lever pivoted on a frame and connected to a rod carrying a first plate fixed to the rod, and a second plate through which the rod freely passes; a spring being positioned in compression between the two plates. The second plate is pivoted on the frame by means of a half-bearing on each side of the rod, and the arrangement is such that a substantially constant supporting force is exerted on a load attached to the lever over a limited range of movement of the load. The lever comprises two lever plates and a bar between them which is attached to the rod. The bar is longitudinally adjustable by means of a nut retained in a cross-piece between the lever plates and engaging with a screw thread on the bar.

---

This invention relates to a constant support device, which can, for example, be used as a supporting device for pipes or for heavy tools.

According to the invention there is provided a constant support device comprising a lever pivotally mounted on a frame and having means for connection to a load, a rod pivotally connected to the lever for movement therewith about an axis parallel to the pivotal axis of the lever, a first plate retained on the rod and substantially perpendicular to its axis, spring means in compression between the first plate and a second plate through which the rod passes, the second plate being arranged for pivotal movement with respect to the frame, the arrangement of the lever and spring means being such that a substantially constant supporting force is exerted on the load over a limited range of vertical movement thereof, wherein the second plate is arranged for pivotal movement with respect to the frame by means of two semi-cylindrical half-bearings between the second plate and portions of the frame, the half-bearings being positioned one on each side of the rod on a common axis parallel to the pivotal axis of the lever.

The frame preferably has two substantially parallel spaced side plates, parts of which form the said portions of the frame which the half-bearings bear upon, and the second plate preferably is between the first plate and the lever.

Any suitable spring means may be employed, for example one or more helical springs, or one or more disc springs.

According to a further aspect of the invention, which may be employed in combination with or independently from the half-bearing arrangement described above, there is provided a constant support device which includes a lever pivotally mounted on a frame and having means for connection to a load and means for connection to spring means, the arrangement of the lever and the spring means being such that a substantially constant supporting force is exerted on the load over a limited range of vertical movement thereof, the lever comprising two substantially parallel spaced lever plates substantially perpendicular to the pivotal axis of the lever and a bar secured between the lever plates in a plane substantially perpendicular to the pivotal axis of the lever, the bar having means for

2 connection to the spring means, wherein the bar is arranged for longitudinal adjustment along a line intersecting the pivotal axis of the lever by means of a nut retained in a cross-piece between the lever plates and engaging with a screw thread on the bar, the cross-piece being on the side of the lever pivot remote from the connection to the spring means.

An embodiment of the invention will now be described, by way of example, with reference to the accompanying drawings, in which.

Figure 1:
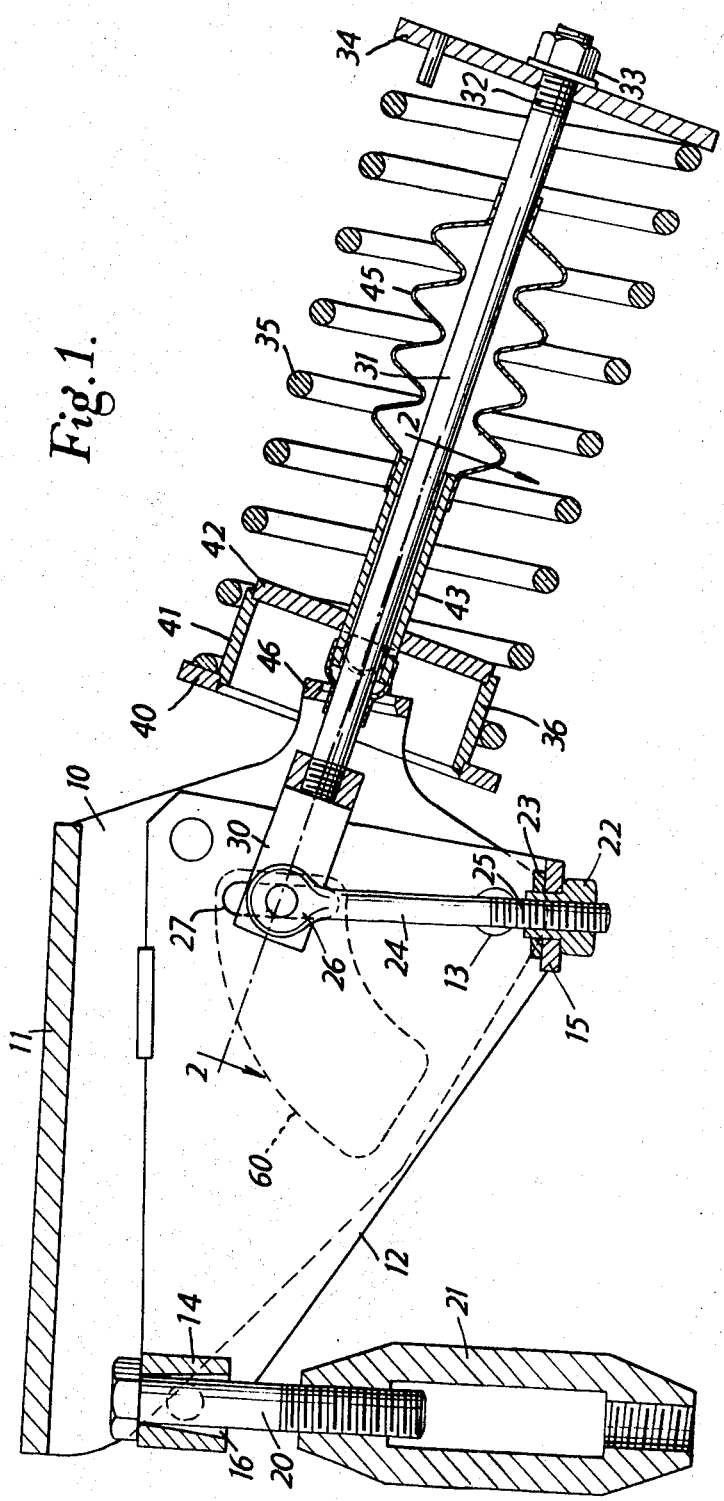
FIG. 1 shows a cross-sectional view of a constant support device embodying the invention.

The constant support device shown in FIG. 1 has a frame comprising two spaced parallel side plates 10, of which one only is shown, attached to a fixing plate 11, which may be provided with bolt holes for connection to a beam or girder to support the load. Pivotally mounted on this frame is a lever comprising two spaced parallel lever plates 12, of which one only is shown, parallel to and inside the side plates 10. The mounting is by means of a pivot pin 13 which defines the pivotal axis of the lever. The lever also comprises a pivoted crossmember 14 and a crosspiece 15. The crossmember 14 has a hole 16 carrying a bolt 20 connected to a turn buckle 21 for connection to the load. The hole 16 is arranged to allow for relative movement of the crossmember 14 and bolt 20 through a small angle.

A nut 22 has a washer 23 welded to it and is thus retained in a hole in the crosspiece 15, but is free to rotate. A bar 24 carrying a screw thread 25 is threaded into the nut 22, and passes through a hole in the pin 13. The crosspiece 15 is arranged so that the bar 24 passes directly between the two pivots 13, so that rotation of the nut 22 purely lengthens or shortens the effective distance between the pivots 13 and a pivot 26 at the end of the bar 24 and does not alter the angular displacement. The pivot 26 is formed by a hole in the end of the bar 24, through which passes a pin which slides in slots 27 in the lever plates and which also passes through holes in the two arms of a yoke 30 which fits around the bar 24.

A rod 31 screws into the yoke 30, and carries at its further end a screw threaded portion 32.

A nut 33 threaded on to the screw thread 32 retains a first end plate 34. A spring 35 is in compression between this and a second plate unit 36. The plate unit 36 consists of an annular portion 40 connected by a cylindrical portion 41 to a circular disc portion 42, as can best be seen in FIGS. 2 and 3. The spring 35 abuts the annular portion 40 and fits over the cylindrical portion 41. The circular disc portion 42 has a hole into which is fixed a length of tube 43 through which the rod 31 can slide. The gap between the rod 31 and the tube 43 is sealed by a sliding seal 44 at the end nearer the yoke 30 and by a flexible bellows 45 at the other end.

Figure 2:
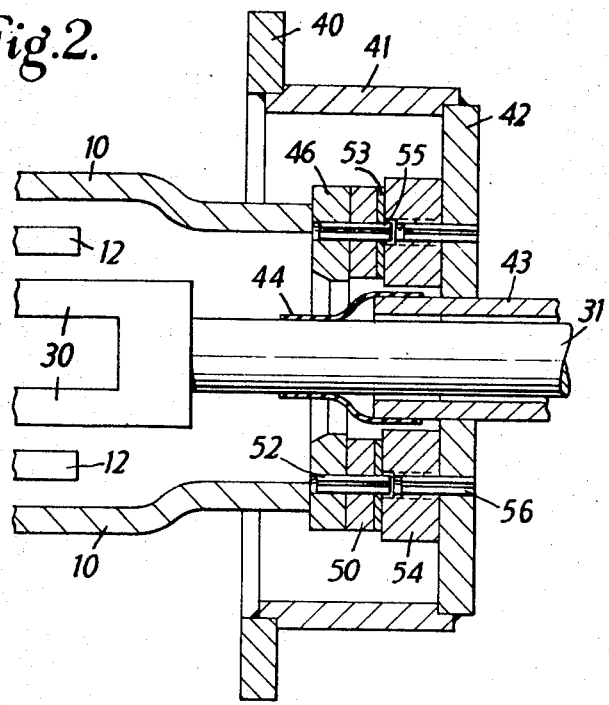
FIG. 2 shows a cross-section of part of the constant support device shown in FIG. 1 taken along the line 2—2 in FIG. 1.
Figure 3:
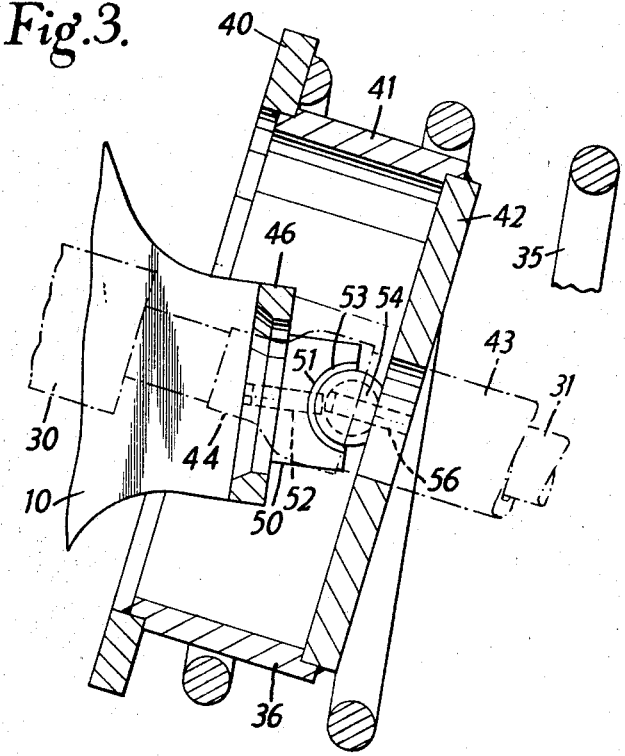
FIG. 3 shows a cross-sectional view of the same part of the constant support device shown in FIG. 1 taken at right angles to that in FIG. 2.

The plate unit 36 is pivotally connected to the frame by means of semi-cylindrical half-bearings. These are best shown in FIGS. 2 and 3. The side plates 10 of the frame carry a rectangular mounting block 46 which has a hole to allow free movement of the rod 31 which passes through it. Fixed to this block so as to be in line with the side plates 10 are two bearing housings 50 for receiving the half-bearings. Each of these has a semi-cylindrical seat 51 cut in the face away from the mounting block extending in a direction perpendicular to the side plates 10. They also each have a hole for receiving a pin 52 which also penetrates a hole in the mounting block 46. The length of the pin 52 is such that, when the pin is fully inserted into the holes in the bearing housing 50 and the mounting block 46 there is a portion projecting from the semi-cylindrical seat 51.

Each bearing surface is formed by low friction composite bush 53, of semi-annular section which has a hole to receive the pin 52. When the bush 53 is in place, a portion of the pin 52 projects beyond it.

Fixed to the circular disc portion 42 of the end plate unit 36 are two bearing members 54 which engage in the semi-circular groove formed by the bushes 53. Each bearing member 54 has a cross-section of a major segment of a circle, and thus presents a flat surface to the circular disc portion 42. The exact cross-section of the members 54 depends on the angle through which the rod 31 must be free to move.

Each bearing member 54 has a circumferential groove 55 which takes the pin 52. The bearing members 54 have holes for receiving pins 56 which also penetrate the circular disc portion 42.

Since the half-bearings are always under compression due to the spring 35, it is not necessary to secure the bearing member 54 into the bearing housing 50. The pins 52 and 56 serve to keep the bearings in alignment, and the pin 52 co-operating with the groove 55 stops any sideways movement of the plate unit 36.

The pins 52 and 56 are preferably self-fixing rolled or wrapped tension pins, which are driven in and thus compressed radially inwards, and when in position they expand to hold the members in which they are inserted.

A slot 60 may be provided in one or both of the side plates 10 to allow the height of the load to be read off on a scale fixed to the side plate.

The operation of constant support devices is well-known. The load applied to the turnbuckle 21 causes the lever to rotate anti-clockwise as seen in FIG. 1 causing the spring 35 to compress further. The dimensions of the lever and the properties of the spring are such that the load has a substantially constant supporting force provided by the device regardless of its vertical position within the operating range of the device. Thus it will be seen that the device operates for a particular rated load, and this rated load can be altered by rotating the nut 22 which alters the effective distance between the line of the pivots 13 and the pivot 26. The nut 22 is therefore the load adjuster, and is easily accessible for adjustment when the device is in its operating position.

The use of half-bearings as described provides several advantages. Amongst these is the fact that the force between the plate unit 36 and the frame is applied through members which directly abut each other. This secures maximum stability of the bearing area and it may be noticed that there is no member which has to take a shear stress as with a conventional pivot pin or whole bearing. Also, it is possible, by using half-bearings, to have a greater area of bearing surface within the same overall volume. An important feature of the particular device shown in the drawings is that the plate unit 36 pivots about an axis which passes through the spring at a point between its ends. This means that the spring is less likely to buckle than if it were pivoted about an axis beyond its end, and also means that the length of the device is reduced while using the same spring.

I claim:

1. In a constant support device including:
   a frame comprising two spaced substantially parallel frame plates;
   a lever mounted between said plates for pivotal movement about an axis substantially perpendicular to said plates;
   means connected to said lever for connecting to a load;
   a rod pivotally connected to said lever for movement therewith about an axis substantially parallel to said pivotal axis of said lever;
   a first plate retained on said rod substantially perpendicular to said rod;
   a second plate having an aperture therein through which said rod freely passes; and
   resilient means in compression between said first plate and said second plate whereby a substantially constant support force is exerted on said load over a limited range of vertical movement thereof;
   the improvement comprising:
      two half-bearings positioned one on each side of said rod between said second plate and said frame plates respectively in substantially the same plane as said respective frame plate, each half-bearing having opposed engaging part-cylindrical bearing surfaces, said cylindrical surfaces of both half-bearings being defined by the same longitudinal axis, and said longitudinal axis being parallel to said pivotal axis of said lever; and
      said opposed part-cylindrical bearing surfaces of each of said half-bearings comprising:
         a part-cylindrical inner surface of a low friction bush mounted on said respective frame plate, and a part-cylindrical outer surface of a bearing member mounted on said second plate.

2. A device as claimed in claim 1, wherein said lever comprises
   two substantially parallel spaced lever plates each substantially perpendicular to the pivotal axis of said lever;
   a bar retained between said lever plates in a plane substantially perpendicular to said pivotal axis, and
   means connecting said bar to said rod.

3. A device as claimed in claim 2, further comprising:
   a cross-piece secured between said lever plates on the side of said pivotal axis of said lever remote from said means connecting said bar to said rod;
   a screw-threaded portion on said bar; and
   a nut retained in said cross-piece and threadedly engaged with said screw-threaded portion of said bar, whereby said bar is longitudinally adjustable along a line intersecting said pivotal axis of said lever.

4. A device as claimed in claim 1, wherein one of said surfaces comprises a part-annular groove and the other of said surfaces includes a projection engaging said groove to resist lateral relative movement of said surfaces.

5. A device as claimed in claim 1, wherein each of said bushes and said bearing members is mounted on said frame plate or said second plate respectively by means of a pin perpendicular to said longitudinal axis.

References Cited

UNITED STATES PATENTS

| | | |
|---|---|---|
| 1,192,966 | 8/1916 | Willard. |
| 2,442,833 | 6/1948 | Watkins _____ 248—54 |
| 2,929,594 | 3/1960 | Wood. |
| 2,974,914 | 3/1961 | Sherburne. |
| 3,034,753 | 5/1962 | Johnston et al. _____ 248—59 |

ROY D. FRAZIER, Primary Examiner